United States Patent [19]

Kessels et al.

[11] Patent Number: 4,598,385
[45] Date of Patent: Jul. 1, 1986

[54] DEVICE FOR ASSOCIATIVE SEARCHING IN A SEQUENTIAL DATA STREAM COMPOSED OF DATA RECORDS

[75] Inventors: Jozef L. W. Kessels; Wijnand J. Schoenmakers; Hendrik Vrielink, all of Eindhoven, Netherlands

[73] Assignee: U.S. Philips Corporation, New York, N.Y.

[21] Appl. No.: 611,911

[22] Filed: May 17, 1984

Related U.S. Application Data

[63] Continuation of Ser. No. 299,749, Sep. 8, 1981, abandoned.

[30] Foreign Application Priority Data

Sep. 12, 1980 [NL] Netherlands .................. 8005136

[51] Int. Cl.⁴ .............................................. G06F 7/22
[52] U.S. Cl. ............................................... 364/900
[58] Field of Search ........................... 364/200, 900

[56] References Cited

U.S. PATENT DOCUMENTS

| | | | |
|---|---|---|---|
| 3,221,158 | 11/1965 | Roth et al. | 364/900 |
| 3,435,423 | 3/1969 | Fuller et al. | 364/900 |
| 3,848,235 | 11/1974 | Lewis et al. | 364/200 |
| 3,964,029 | 6/1976 | Babb | 364/900 |
| 4,064,553 | 12/1977 | Kashio | 364/200 |
| 4,101,968 | 7/1978 | Florence | 364/900 |
| 4,149,262 | 4/1979 | Lamb et al. | 364/900 |
| 4,255,796 | 3/1981 | Gabbe et al. | 364/900 |
| 4,257,110 | 3/1981 | Lamb et al. | 364/200 X |
| 4,332,014 | 5/1982 | Nakazawa et al. | 364/900 |

Primary Examiner—James D. Thomas
Assistant Examiner—David L. Clark
Attorney, Agent, or Firm—Jack E. Haken; James J. Cannon, Jr.

[57] ABSTRACT

A device for the processing of a data base consisting of a sequence of data records, having a reference memory (140) for a reference data record and a mask memory (142) for a mask data record. In reaction to the successively received data of a data record, these memories can be read in order to activate a comparison. There is provided an indicator element (160) which has a state "provisionally correct" and which is activated by a starting signal produced by the reception of a data record. If the comparison indicates that an impermissible relationship exists between the content of an element of the data record received and the corresponding element of the reference data record, the indicator element is set to the state "incorrect". The data record received is meanwhile stored in a data buffer (100,102). At the end of the reception, the state of the indicator element indicates whether or not the data record may be applied to a user. The data buffer may consist of two buffer sections, each for one complete data record, which alternately operate in a read mode and a write mode.

6 Claims, 8 Drawing Figures

DEVICE FOR ASSOCIATIVE SEARCHING IN A SEQUENTIAL DATA STREAM COMPOSED OF DATA RECORDS

This is a continuation of Ser. No. 299,749, filed Sept. 8, 1981, now abandoned.

BACKGROUND OF THE INVENTION

1. Field of the Invention

The invention relates to a device for the processing of a data base which is composed of a sequence of data records. This device has a first input for successively receiving said data records from a background memory;

a comparison device for comparing a predetermined data field of a data record received with reference information and for forming a result signal on the basis of the comparison; and an output device which has a first output, under control of a "correct" result signal, for making the relevant data record available for further processing.

1. Description of the Prior Art A device of this kind is described in U.S. Pat. No. 3,848,235. Large data bases are stored in background memories. These memories are generally of the sequential type, such as magnetic or optical disk memories or magnetic bubble memories. A data base of this kind usually consists of tables. Each element of a table is formed by such a data record which contains a number of data relating to the same entity. The entire may be, for example, a person. The information can be searched in various ways, it being assumed that all data records in the table have at the most a predetermined length:

1. selection: the entire content of a data record is or is not supplied to a user, depending on a part of its content.

2. projection: depending on a part of the content of a data record, a second predetermined part of the data record is supplied to a user.

The testing of the content in the comparison device may concern correspondence between a key word and a predetermined part of the data record to be searched. Similarly, it may concern correspondence to one of a set of key words. In the latter case, the key words are comparatively short. The projection can be performed in two or more steps; the part extracted from the content of a data record can subsequently be used as a new key word in a second table (or the same table). Finally, the content may also be tested to indicate a relationship such as "larger than", "between given limits", and different relationships can also be tested by the same comparison operation; for example: for a first field of the data record searched, correspondence is required and the value of a second field must be between predetermined limits.

The searching of the relevant information is performed by a central processor unit CPU in the known system (for example, see the abstract of said patent. This means that this unit is not available for other purposes during this period. Furthermore, in many cases the background memory supplies the information at a rate which is higher than the processing rate of the processor. Many successive access operations for the background memory are then required for the searching of a table. It is alternatively possible to transfer a block of information from the background memory to a foreground memory, but it has been found that such a foreground memory often requires a considerable capacity.

SUMMARY OF THE INVENTION

It is an object of the invention to provide a simple and hence fast device for continuously updating the result of the comparison device during the reception of the successive data blocks in order to initiate the transfer of the information, whether or not complete, of a data record to a user at the latest upon completion of the reception of the data record. The object in accordance with the invention is realized in that the device also has a data buffer which is connected between said first input and said output device. The buffer has a dynamic second input and a dynamic second output which can be activated together for a data transfer, said buffer having a capacity which suffices for the storage of at least one complete data record. The device also has a comparison device which includes a reference memory for a reference data record;

a mask memory for a mask data record, whose content indicates said data field, said memories being activatable upon reception of a data record in the data buffer for the successive selective activation of a comparison between an element of a data record received and a corresponding element of the reference data record in order to detect a permissible relationship or an impermissible relationship between their contents;

an indicator element which has a state "provisionally correct" which is activated by a starting signal produced by the reception of a data record, and a state "incorrect" which is activated by the signal produced by the detection of an impermissible relationship; the "correct" result signal being applied to the output device only if the state "provisionally correct" still prevails after the reception of a complete data record.

The indicator element makes a fresh start when it starts the updating of a new data record. It is set to the state "incorrect" only if the mask memory indicates that the relevant bit position participates in the comparison and, moreover, the required relationship is not satisfied for the relevant element of the data record. At the end of the data record, the output device may remain closed (incorrect) or may be opened (correct). A dynamic input is to be understood to mean herein an input where the information received can be directly stored, regardless of the filling degree of the buffer, provided that the buffer is not completely filled. On a dynamic output, there is always output information available, unless the buffer is completely empty. Examples of such a buffer are a random access memory (RAM) and a first-in-first-out memory (FIFO). FIFO memories may have an organization where the information is densely packed by means of an internal shifting operation. Such a shift operation does not take place in another embodiment; the next memory location to be written or read can then be indicated by means of a stepping address counting mechanism.

Preferably, said data buffer comprises two buffer sections, each of which has a capacity which suffices for the storage of at least one complete data record, said buffer sections alternately operating in a read mode and a write mode and being activated together with the reference memory and the mask memory, there being provided a mode control element with a mode control input which is switched over after each reception of a complete data record in order to change the control of said read and write modes. The buffer may thus have a simple organization. This is a cheap solution. On the other hand, the buffer may have a smaller capacity, but in that case the previous data record has to be read when the next data record is received.

Further Aspects of the Invention

Preferably, said reference memory and said mask memory have at least the capacity of one buffer section, the reference memory, the mask memory and the two buffer sections being activated by a common address generator. This results in a simple organization, notably if all said memories are of the random access type. Preferably, for the comparison of a second data field with a set of a plurality of reference data there is provided a membership memory for which the content of said second data field acts as an address and whose content contains "presence" information for each element of said set. A simple extension thus results in an attractive further feature of the device.

Preferably, said "presence" information is applied, together with said "correspondence" result signal, to a combinatorial circuit in order to form a second "correspondence" result signal. Two or more different tests can thus be simultaneously performed in a simple manner.

Preferably, there is provided an extract generator which can be addressed together with said buffer sections in order to indicate the validity for an extract of each information unit read from said data buffer, a data output of the extract generator being connected to a control input of the output device in order to make the latter conduct only under the control of a signal indicating "validity". The load for a user device is thus reduced, because the information is selected further.

Preferably, the extract generator has at least the same capacity as each of said buffer sections, the output device comprising a series/parallel converter whose series input can be activated by a "validity signal" from the extract generator for the parallel conversion of the conducted data of the data buffer each time into data units of several bits. Thus, the validity can be bit-wise indicated, while the user device (CPU) receives the data in the form of data words, bytes, etc. which are directly suitable for further processing. The extract generator and the buffer sections may have a bit-wise or a word-wise organization.

Preferably, there are provided a first and a second projection memory for the execution of projections in a series of (n−1) steps between a series of n types of data record which each successively comprise first and second data fields according to (A1, B1), (B1, B2), . . . (B(n−1), Bn), the first projection memory being addressed by the content of the data fields (B1, B3. . . ), the second projection memory being addressed by the content of the data fields (B2, B4. . . . ), the data of the data fields A1 being stored in the first projection memory and being transferred from the one to the other projection memory under the control of the data of a pair of data fields (Bj, Bj+1) of the next type of data record. Dynamic restructuring of the data base is thus possible in a simple manner, as will be described in detail hereinafter.

BRIEF DESCRIPTION OF THE FIGURES

The invention will be described in detail hereinafter with reference to a number of FIGS.

DESCRIPTION OF THE PREFERRED EMBODIMENT

Description of Two General Block Diagrams

Figure 1:
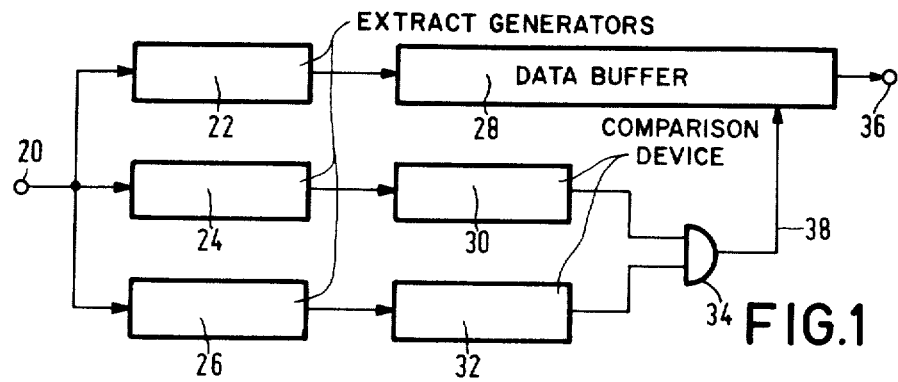
FIG. 1 shows a general block diagram of a first embodiment of a device for the processing of a data base.

FIG. 1 shows a general block diagram of a first embodiment of a device for the processing of a data base. The data records successively arrive on input 20. Three extract generators 22, 24, 26 are connected thereto. In the extract generator 24, there is selected the part of a data record received which has to be compared with the content of reference information in order to determine whether a relationship is permissible or not (the allowable relationship being equally, larger than, etc.). In the extract generator 22 there is selected the part of a data record received which has to be presented to a connected user device in the case of detection of a permissible relationship in comparison devices 30 and/or 32. In the extract generator 26 there is selected the part of a data record received which has to be compared with a number of simultaneously present reference data in order to determine whether or not there is correspondence. In the comparison device 30 it is detected whether or not the correct relationship exists between the data originating from the extract generator 24 and the locally present reference data. In the comparison device 32 it is detected whether or not the information originating from the extract generator 26 corresponds to one element of a set of locally presented reference data. The information selected by the extract generator 22 is temporarily stored in data buffer 28. Element 34 is a combinatorial logic circuit which can receive a logic "1" as an "OK" signal from each of the comparison devices 30, 32. If a "correspondence" or "OK" signal is present on both inputs of this gate after reception of the complete data record on input 20, the buffer 28 is activated via the line 38 in order to present its content on terminal 36. Similarly, another combinatorial function can be implemented in the element 34. The background memory (connected to input 20) as well as the user device (connected to input 36) have been omitted for the sake of simplicity; these elements may be of a conventional type.

Figure 2:
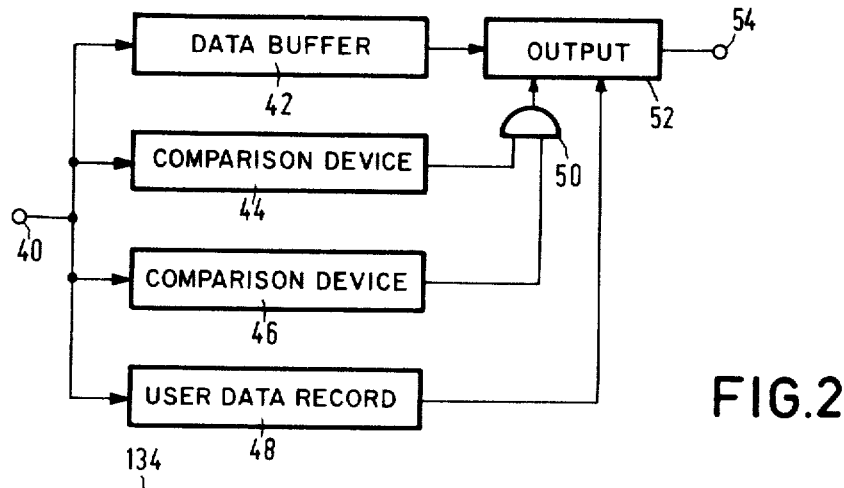
FIG. 2 shows a general block diagram of a second embodiment.

FIG. 2 shows a general block diagram of a second embodiment. The data records arrive on input 40. The complete information is stored in data buffer 42. In comparison device 44 it is detected whether or not the correct relationship exists between a predetermined part of the data record received and locally present reference information. In comparison device 46, it is detected whether or not a second predetermined part of the data record corresponds to one element of a set of locally present reference data. In extract generator 48 the part of a data record received is indicated which has to be applied to a user when correspondence is detected. The reference numeral 50 denotes a combinatorial logic circuit which receives the correspondence signals from the comparison devices 44 and 46. If "correspondence" signals are present on both inputs of this circuit (shown here as an "AND"-gate) after reception of the complete data record on input 40, output device 52 may be unblocked. However, this is done exclusively for the part of the data record indicated by the extract generator. From a functional point of view, the output device comprises two series-connected gating elements. Each of these elements is activated by an output signal of the relevant elements 50 and 48. A user device (not shown) is connected to the output 54.

Figure 3:
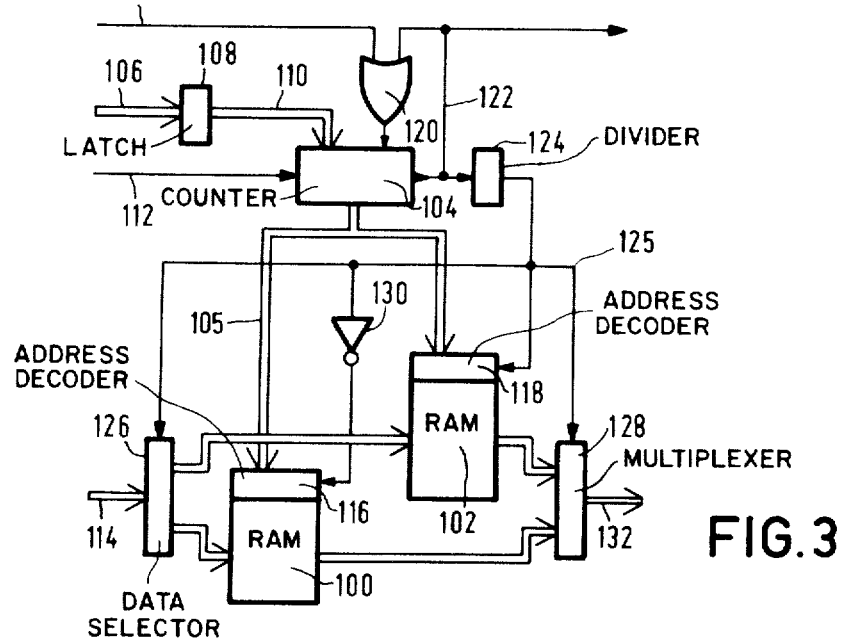
FIG. 3 shows a block diagram of a data buffer.

FIG. 3 shows a data buffer which comprises a dynamic input and a dynamic output. For the environment, this buffer acts as two shift registers of programmable length. From a physical point of view, the buffer is composed of two random access memories 100, 102 (RAM). The addresses are generated by a programmable counter 104. When the memory 100 is written, the other memory is read, and vice versa. The operation of the circuit is as follows. Line 106 can receive data which indicates how many bytes are present in the data records to be processed. 1024 bytes is chosen as the upper limit, so that the width of the line 106 is at least 10 bits. Element 108 is a latch circuit or data flipflop circuit having at least the same width as the line 106, and the control line of which has been omitted for the sake of simplicity. This hold circuit is loaded each time new upper limit information is received on line 106. Subsequently, this information is continuously available on line 110. If the data records have a fixed length, the element 108 is not required and the counter 104 is programmed to this fixed length. For further applications to be described, use is made of a counter having a higher counting capacity; however, this does not have any consequences for the operation of the circuit shown in FIG. 3. The counter 104 receives counting pulses on line 112, each time in synchronism with the appearance of a data byte on line 114. The state of the counter 104 is applied each time as an address to address decoders 116, 118 of the relevant memories 100, 102. Furthermore, these memories receive a clock pulse together with the counting pulses on line 112, i.e. at the instants at which the data signals on the line 114 are stationary; the connection for the latter clock signals is not separately shown. The formation of the synchronization signals used here and elsewhere will be described with reference to FIG. 7. Furthermore, the signal from OR-gate 120 normally has the value 0: when this is so the counter 104 continues counting under the control of the counting pulses until the predetermined number corresponding to the length of the data record is reached (this is done easiest by counting down to zero). At that instant, a logic "1" (EOB) appears on line 122. This signal has three consequences. First of all, OR-gate 120 then produces a "1", so that counter 104 is loaded again with the content of the latch circuit 108. Furthermore this "1" is applied to a data user in order to indicate that the buffer now contains the complete next data record. The same signal EOB can also be used elsewhere in the circuit (see FIG. 7) as a control signal. Finally, the two-divider 124 is switched over in order to form the signal EOB−2 on line 125. In the first state of the two-divider 124, the information from line 114 is applied to memory 100 via data selector 126. A write control signal is then applied to this memory via inverter 130. Furthermore, multiplexer 128 is controlled so that the data from memory 102 appears on output line 132. To this end, the output of the two-divider 124 is connected directly to the memory 102 in order to supply a read control signal in that case. In the other state of the two-divider 124, the functions of the memories 100, 102 are interchanged. An additional load signal can be applied on line 134, i.e. if a new series of data records have to be tested.

Figure 4:
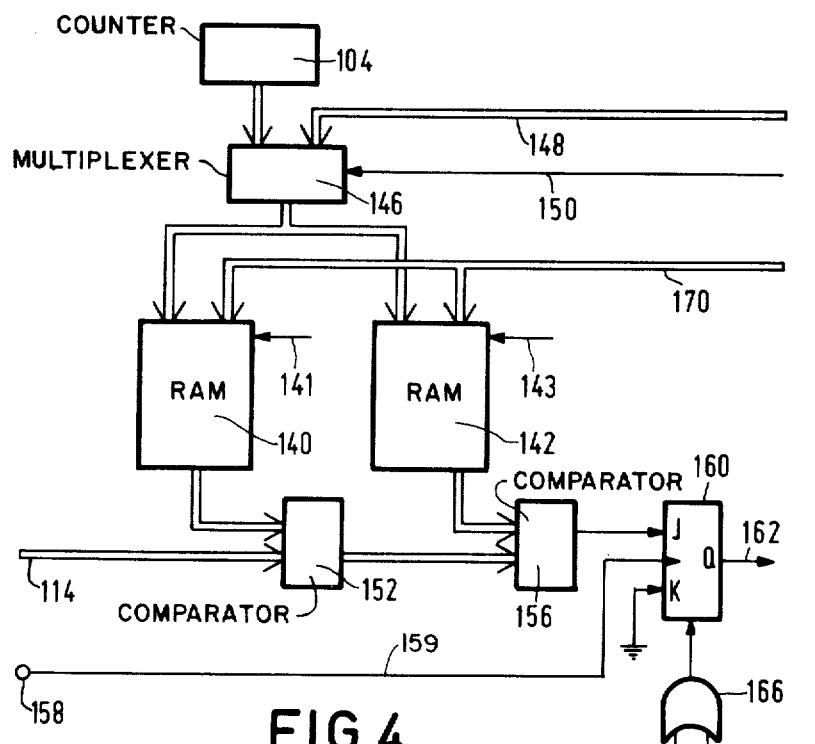
FIG. 4 shows a block diagram of a comparison device.

FIG. 4 shows a block diagram of a comparison device. Bit-wise correspondence to reference information is tested. Similarly, other relationships can be tested. Each relationshp can be expressed as a required correspondence to one element of a set of values.

Element 140 is a random access memory having a capacity which equals that of each of the memories 100, 102 of FIG. 3. It is used for the storage of the reference information. Element 142 is a similar memory for the storage of mask information. During a comparison operation, these two memories are addressed together by the state of the programmable counter 104 shown in FIG. 3. Element 146 is a multiplexer which has a width of 10 bits and which conducts either the state of the counter 104 or an externally formed address on line 148. The latter takes place under the control of a bivalent signal RUN/LOAD on line 150. Line 148 is used only during loading. During the comparison, a data byte received on line 114 (compare FIG. 3) is compared bit-wise in element 152 with the data byte being read from the memory 140 at that instant. The circuits of FIG. 3 and FIG. 4 thus operate in parallel. The element 152 forms, in parallel for each of the 8 bits on the line 132, the EXCLUSIVE-OR function with the corresponding bit read from the memory 140. For as long as the two bytes are the same, the element 152 produces eight logic "0" bits. If the two bytes received differ, element 156 receives at least one logic "1" bit. The memory 140 thus contains the reference data record. For each data byte received on line 114, the memory 142 each time supplies a mask word having a width of 8 bits. If this word contains a logic "1" in a location, the relevant bit position is taken into account for the comparison; in the case of a "0", this bit position is not taken into account. The element 156 is a 8-fold two-input AND-gate, the 8 outputs of which are combined to form an OR-gate. Any discrepancy between data and reference which has to be taken into account thus appears as a logic "1" on the output of element 156. Under the control of a clock pulse on line 158, this "1" is stored in the JK flipflop 160 via the J inputs. The K input thereof is connected to ground. At the end of the comparison of a data record, the result signal on line 162 indicates whether or not the comparison has resulted in correspondence. Before the start of the test of the next data record, the signal EOB is received on input 164 in order to reset the JK flop 160 to the zero position via OR-gate 166. An additional reset signal can be received on line 159. The modification of the data in the memories 140, 142 can be realized by the external input of an address on line 148 which is conducted by multiplexer 146 under the control of the control signal on line 150. If the circuits of the FIGS. 3 and 4 are combined, the multiplexer 146 must be included in the address line 105 of both memories 100, 102. The memories 100 and 102 per se do not require external addressing. Furthermore, the memories 140, 142 also involve selective write control which is realized by signals on the lines 141 and 143, respectively. Reference data and mask data can thus be independently modified. The data appears on line 170.

Figure 5:
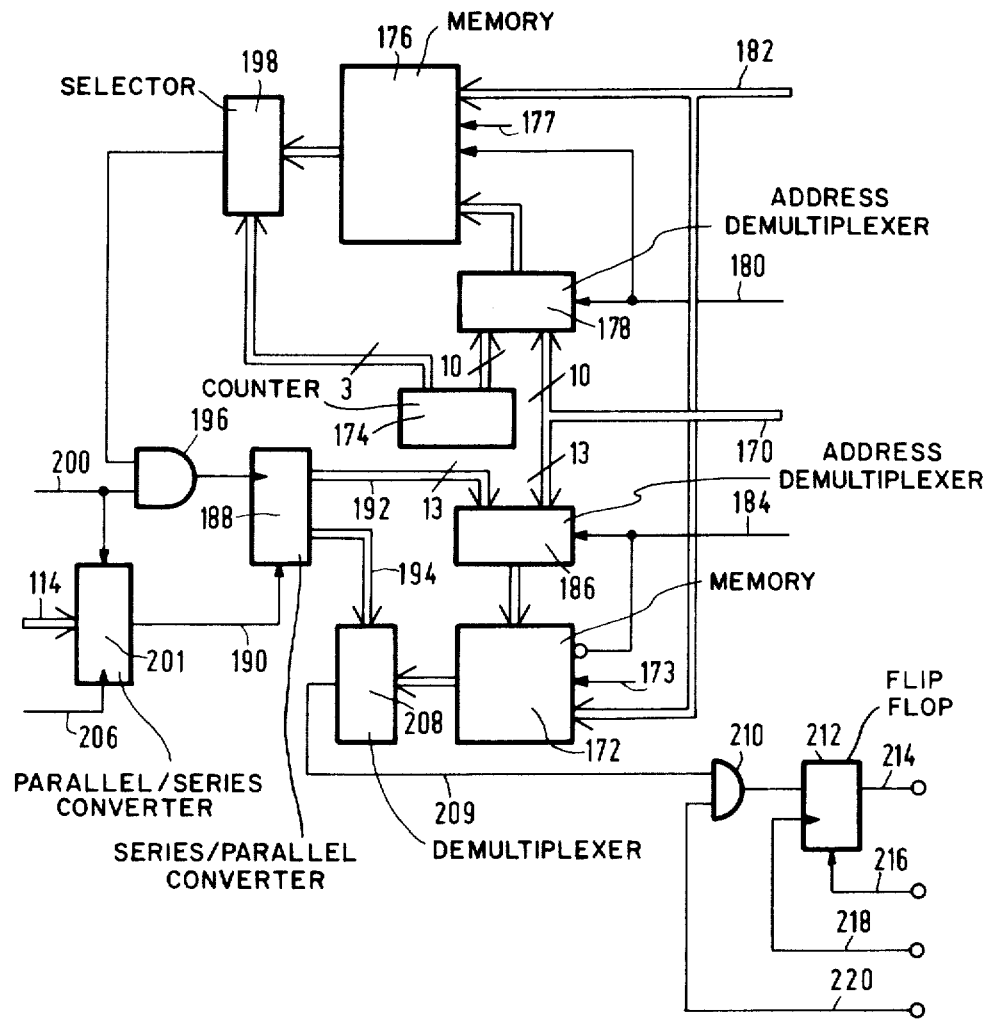
FIG. 5 shows a block diagram of a second comparison device for comparing the content of a data field with a set of a plurality of reference data.

FIG. 5 shows a block diagram of a second comparison device for comparing the content of a data field with a set of a plurality of reference data; however, only a small part of each data record is subjected to the comparison. A data field having a length of 16 bits is chosen. For each of the $2^{16}$ possibilities, it must in principle be detectable whether the relevant data field belongs to the "correct" or the "incorrect" category. Use is made of the fact that only one bit of information has to be stored for each of the $2^{16}$ different possibilities. This information is present in the memory 172. This memory has a capacity of 8k words of 8 bits each. The circuit shown in FIG. 5 comprises an input 170 for a thirteen-bit address; this may be the same line as the address line 148 of FIG. 4. The three additional bits in that case act as the least-significant bits. These three bits where not previously required. In the circuit shown in FIG. 5, they are used exclusively for addressing the memory 172, (so not the memory 176). The address line 170 is connected to the address demultiplexers 178 (for 10 bits) and 186 (for 13 bits). The outputs of these demultiplexers are connected to the relevant address inputs of the memories 176 and 172, respectively. The content of the memory 176 selects the data field from the data record received. The content of the entire data record successively arrives in the element 201 via the line 114 already shown in FIG. 4.

The data field is selected as follows. The counter 174 successively addresses the word locations of the memory 176 via the address demultiplexer 178; this demultiplexer is unblocked by a control signal on the line 180 which also controls the memory 176 in the read mode. This counter is actually the same counter as the counter 104 of FIG. 3; the clock input and the latch circuit 108 for this counter have been omitted for the sake of brevity. The capacity of this counter amounted to 10 bits in the foregoing, but now amounts to 13 bits; therefore, it receives 8 clock pulses per data byte appearing on the data line 114. The three least-significant bits of the counter contents control the selector 198. The latter actually operates as a parallel/series converter for the data byte read from the memory 176. The three least-significant address bits need not be externally loaded. The same, 8 times higher clock pulse frequency appears on the input line 200: element 201 is also a parallel/series converter. The signal on line 206 appears as a load signal once per data byte received. The signal on terminal 200 acts as a shift control signal. All data bits of the data records thus appear, successively on line 190. The element 188 is a series/parallel converter having a capacity of two bytes (16 bits). The output line of the AND-gate 196 now acts as the clock pulse line: if the element 198 supplies a logic "1", it acts as a shift pulse for the element 188. The element 188 operates for 16 bits. At the end of the reception of a data record on the line 114, the element 188 contains the data bits thereof which have been selected by the "ones" from the memory 176: this is the data field. If the memory 176 contains more than 16 "1" bits in the memory section used for the selection of a data field, only the 16 "1" bits most recently read therefrom are active. The content of the element 188 then acts to address the memory 172 as follows. The demultiplexer 186 acts on 13 address bits. Under the control of the bivalent signal on the line 184, the demultiplexer 186 conducts the signal on line 192. The memory 172 receives the signal on the line 184 as the read control signal and, if necessary, also an activation signal (not shown for the sake of brevity) at the end of the reception of the complete data record. In the embodiment shown, this end is signalled by the signal EOB on the line 218. Under the control of said signals, a data byte is read and applied to element 208. This is a 1-out-of-8 selector or, for example, a demultiplexer which conducts a single one of the 8 bits received under the control of the three-bit signal on the line 194. The signal on the line 194 contains the other three bits of the 16 bits available in the element 188. On line 209 a single bit then appears which indicates whether or not the data of the data field in the element 188 constituted an element of the data field in the element 188 constituted an element of the set searched. This signal is applied to the AND-gate 210. The output signal of the line 162 of FIG. 4 appears on line 220; this signal indicates whether or not the relevant data field also exactly satisfied a given correspondence test. Thus, two tests can be performed together on the same data field. If it is certain that these two tests will never be performed simultaneously, the mask memories of FIG. 4 (element 142) and FIG. 5 (element 176) may be embodied in the same memory. It will then be necessary to add a few control lines which will not be described herein. A similar consideration applies to the memories 172 (which is then used in two different ways) and 140.

In the described embodiment, the signal from the AND-gate 210 is applied to the data input of flipflop 212 (D-type). On the line 218 a clock signal appears as the signal which indicates the end of the relevant data record; as has already been stated this signal is derived from line 122 in FIG. 3. The information on line 214 then indicates whether or not the relevant data record may be applied to a user. A reset signal can be received on line 216.

The loading of the memories 176, 172 takes place in the same manner as previously described for other memories. A signal on the line 180 controls a write operation in memory 176 and makes the demultiplexer 178 conduct the data (width 10 bits) on line 170. The data to be written then arrives on line 182. An additional activation signal can appear on line 177 once per memory cycle. Similarly, a signal on line 184 can control a write operation in the memory 172 and make the demultiplexer 186 conduct the data on line 170 (not 13 bits). The memory 172 can also receive a specific activation signal on line 173 per memory cycle.

Figure 6:
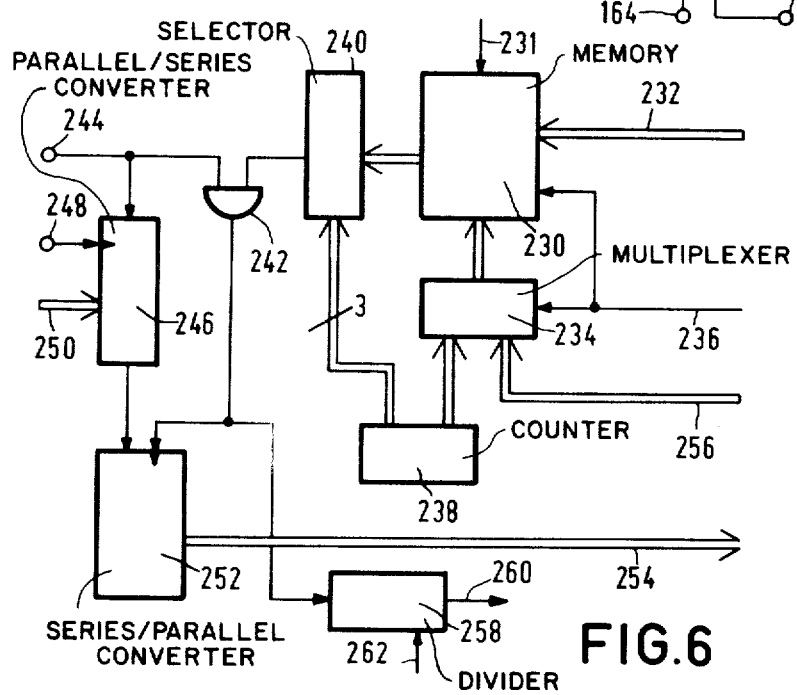
FIG. 6 shows a block diagram of an extract generator.

FIG. 6 shows a block diagram of an extract generator. The central element is formed by a memory 230 having a width of $1024\times8$ bits. This memory is normally addressed by a ten-bit address from the counter 238 (this is again the counter 174 of FIG. 5); this address is conducted through multiplexer 234 under the control of a first signal value on line 236. The other signal value on line 236 conducts the address of line 256 and controls a write operation in the memory 230 with respect to the data on line 232. Per read cycle an additional control signal can appear on line 231. Per read cycle also the three least-significant bits from counter 238, described with reference to FIG. 5, appear as a selection signal for the element 240 which again acts as a one-out-of-eight selector. The already described 8 times higher clock pulse frequency also arrives on input 244. The AND-gate 242 thus produces a "1" signal only if the extract mask memory 230 produces a logic "1". Element 246 is a parallel/series converter. The data byte received on data input 250 is stored under the control of a clock pulse on input 248 which indicates that a data byte is valid. This byte is presented to the output of element 246 under the control of the pulses on input 244. Element 252 is a series/parallel converter which combines the data bits received to form 8-bit bytes which are successively presented on line 254. The presence of such a complete data byte is signalled by the 8-divider 258. This divider counts the output pulses of the gate 242. Each time 8 pulses have been received, an output pulse appears on line 260. At the beginning of a data record, element 258 receives a reset signal on line 262. This signal may originate from OR-gate 120 in FIG. 3.

Figure 7:
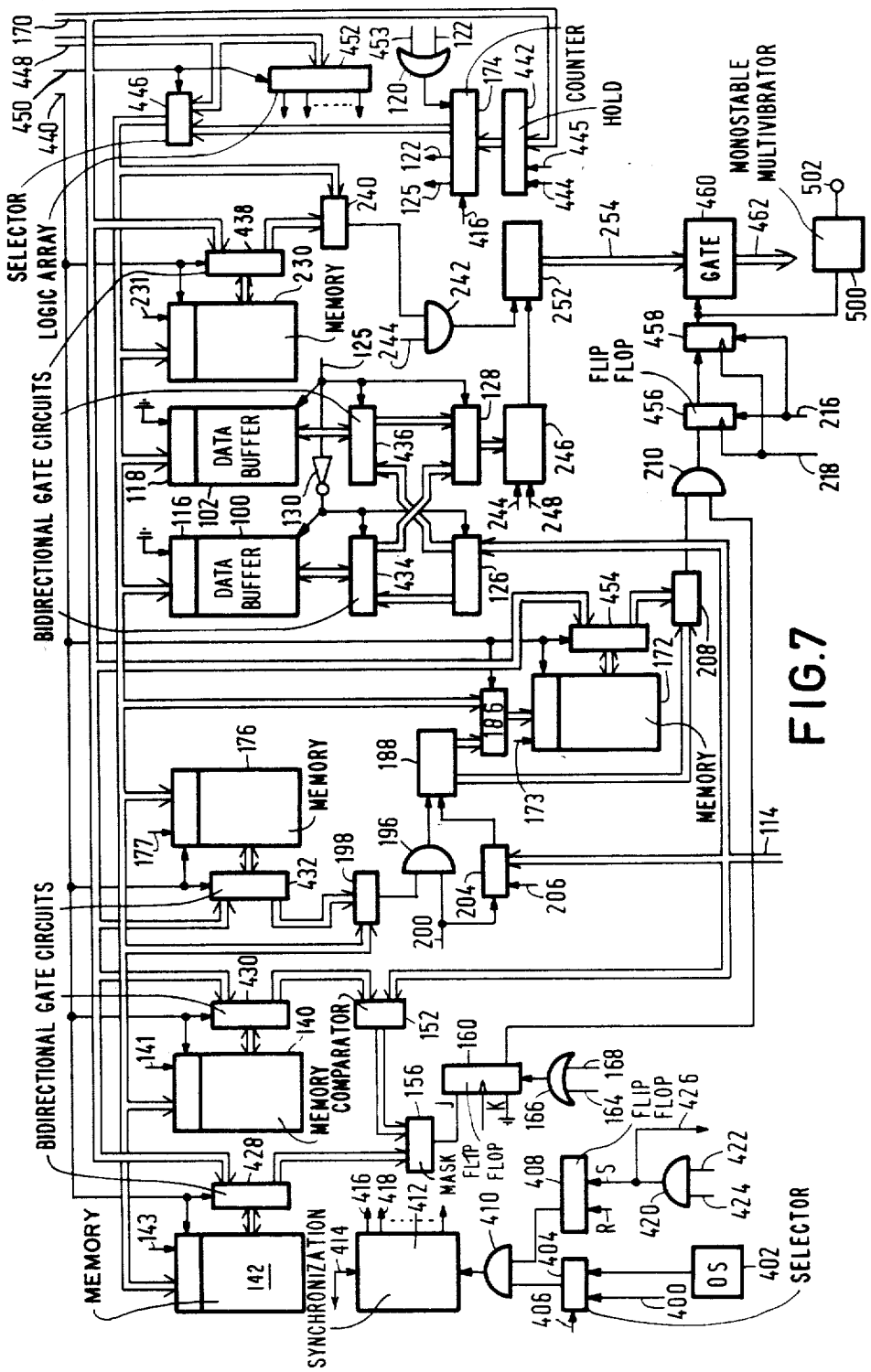
FIG. 7 shows a combination of the FIGS. 3 to 6.

FIG. 7 shows the combination of the circuits of the FIGS. 3 to 6. First of all there is provided a circuit (412) for generating synchronization pulses. This circuit comprises an input for receiving a signal CKIN (400). This is a pulse train which is supplied by the background memory (not shown) and which has a frequency which corresponds to the frequency with which the data bytes are presented on the data input 414. A pulse train of this kind can also be supplied by the local oscillator 402, for example if after the reception of the last data record in the data buffer 100/102, this record has to be presented to a user device. Like the background memory, the oscillator 402 may also be active at a variety of frequencies; when this is so the device of FIG. 7 can always operate at the maximum permissible clock frequency. Element 404 is a selector which conducts either the pulse train CKIN or the signals from the element 402 under the control of a bivalent signal on the line 406.

Element 408 is a set/reset (RS) flipflop. The reset signal (RESET) can be received on the R-input. The AND-gate 410 then conducts the pulse train selected by the element 404. Element 412 is the synchronization generator. For each pulse received, this element generates:

(a) a clock pulse CKOUT on output 414 which acts as a synchronization pulse for an external device (background memory or user device);

(b) a series of 8 pulses on output 416 in order to control the parallel/series conversion of the data bytes, for example, as described with reference to FIG. 5;

(c) a number of mutually phase-shifted pulse trains on output 418 and further outputs in order to perform the relevant synchronization functions per clock pulse cycle.

The AND-gate 420 receives the already described signal EOB on its input 422 (line 122 in FIG. 3) and on input 424 it receives a signal which is produced by the background memory during the presentation of the last data record of the relevant data base. This signal is supplied by the control unit of the background memory because this information is present, for example, in the disk memory and is detected by the control unit thereof. Data of this kind is customarily used. This signal EOF (end-of-file) is combined with the later appearing signal EOB whereupon the AND-gate 420 produces a "1": the signal "ready" appears on line 426 and the background memory can start another operation. The signal from the gate 420 switches over the flipflop 408 and blocks the gate 410. In this organization, the last data record of a data file may be a dummy record, i.e. without user information.

Most other parts have already been described and are denoted by the same reference numerals as used in the previous Figures. There are six memories having a capacity of 1k×8 bits (142, 140, 176, 100, 102, 230). Each of these memories is realized by two modules of the type 2114 (Intel Corporation). There is also provided a memory 172 having a capacity of 8k×8 bits. This memory is realized by sixteen modules of the type 2114. The data inputs and outputs are each time combined and comprise a bidirectional gate circuit (428,430,432, 434, 436, 438, 450). Each of these circuits is realized by two parallel connected modules of the type 74LS244, abbreviated "244", of the known series of TTL modules (Texas Instruments). These modules are controlled by the read/write control signal WE which is common to the memories 142, 140, 172, 176, 230 on the terminal 440 (see line 180 in FIG. 5, line 236 in FIG. 6, not separately shown in FIG. 4). For each of the memories 140, 142, 172, 176, 230 an individual selection line is provided: 141, 143, 173, 177, 231, respectively. The addresses are supplied by the address counter 174 (consisting of four TTL circuits of the type 74161, thus having a capacity of 16 bits; the bits which are not necessary are not further used. Also provided is a 16-bit hold circuit 442 (two modules 74273) which defines the length of the data record. Loading is realized by a control signal on terminal 444. Via data selector 446 (four modules 74157), addresses externally received on line 448 can also be conducted. The relevant control signal arrives on line 450. The address line has a width of 14 bits; this is necessary to allow for separate addressing of each data byte. The addresses are also applied to the local programmable logic array (FPLA) 452 which is composed of a number of modules of the type 82S100 (Signetics). Each of these modules comprises eight outputs and serves as an additional address decoder. The outputs are connected to the selection inputs 231, 177, 141, 143, 144, 445 (the two halves of the element 442), 173, 452 (134 in FIG. 3—load control), respectively. The inputs 231 etc. in this embodiment are actually double, because these memories consist of two halves; the most significant address bit, however, can be used for this additional selection. The same is applicable to the memory 172. The signal on the line 450 is also applied to the programmable logic arrangement 452, because all memories are selected for a processing operation, while in the case of a load operation usually only one of the memories is selected (RUN/LOAD).

Furthermore, element 152 (comparison) is a double module of the type 7486; element 156 (masking) is an arrangement of three modules 7400 (2×) and 7430; flip-flop 160 is a module of the type 7473 (one half thereof). Element 198 is a module of the type 151; element 196 is one quarter of a module of the type 7408; element 204 is a module of the type 165; element 188 is a double module of the type 164, element 186 is a double module of the type 74LS157. The data connection of the memory 172 is connected via data selector 454 (the connections from line 170 or to element 208 are always active in one direction only) which is a double module of the type 244. Element 208 is a module of the type 74151; gate 210 is one quarter of a module of the type 7408. For the loading and unloading of the data buffer (100/102), the elements 126, 128 are each time composed of two modules of the type 74157. The element 246 connected thereto (see FIG. 4) is a module of the type 74165; element 242 is one quarter of a module 7408; element 240 is a module of the type 74151; and element 252 is a module of the type 74164. The construction of the output circuit deviates slightly from that shown in FIG. 5 so that the "correct" signal concerning a data record can be presented to the element 460 at the instant at which the relevant data record becomes available for further processing on the output of the data buffer 100/102. Two data flipflops 456, 458 (parts of modules 7474) are connected in series, said flipflops being controlled by the lines 218 (EOB) and 220 (reset signal), respectively. The output signal of the flipflop 458 controls a gate circuit 460 of the type 241. 8 bit data bytes as selected from the data buffer by the extract generator then appear on line 462. The 8-divider 258 of FIG. 6 has been omitted for the sake of simplicity. The output of the flipflop 458 is connected to element 500. This is a restartable monostable multi-vibrator of the type 74123 which signals the validity of the data (DATA VALID) for a user device at the correct instant and in the correct manner. The arrangement shown in FIG. 7 has a storage capacity (without registers) of 112 kbit and comprises approximately 850 logic gates. This can be realized by means of approximately 80 integrated modules. These modules can be accommodated on a standard "EUROCARD" (236×220 mm) if the wire-wrap wiring technique is chosen. The dissipation amounts to approximately 13 W.

Figure 8:
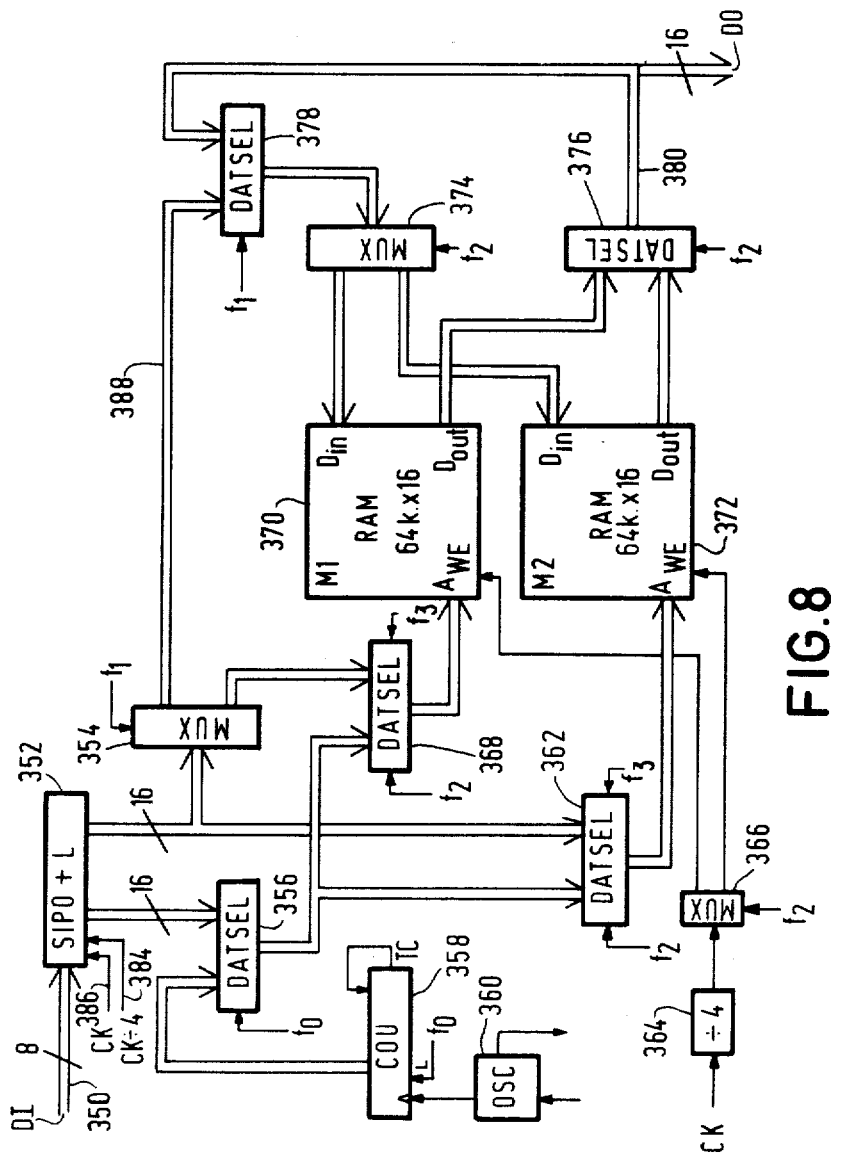
FIG. 8 shows a block diagram of a device for executing projections in several steps.

FIG. 8 shows a block diagram of a device for executing projections in several steps. These projections are executed by dynamic restructuring of a part of the data base, as will be described hereinafter. It is assumed that several types of data record are present. For example, in a first type of data record the data R1, R2, R3, R4 are stored. These data may concern a bank account: the name, the address, the balance and the account number. A second type of data record stores, for example, the data R4, R5, R7: the account number, the required minimum balance (positive or negative), and an indication of how many times the account holder has overdrawn during a given period. For example, by the coupling of R1 and R7, the bank can obtain a survey of all account holders who have overdrawn more than once. The data records (R1, R2, R3, R4) and (R4, R5, R7) may be independently modified. For the management of a data base it has been found that the data of an account holder are preferably not all stored in a single data record (for example, because it would be too long, or in view of the accessibility which is limited for security reasons).

Hereinafter it will be assumed, by way of example, that there are four types of data record, containing the data:

(R1, R2, R3, R4)
(R4, R5, R7)
(R6, R7, R8, R9)
(R9, R10, R11).

Assume that a list (R1, R11) is required which states for one or more given contents of the data R1, each time the associated data R11.

The circuit shown in FIG. 8 notably comprises a data input 350 which has a width of 8 bits and which is connected to the data output 462 of FIG. 7. A clock input 386 is connected to the signalling output 260 of FIG. 6. The circuit comprises two random access memories (RAM) 370, 372. These memories have a capacity of 64 k words of 16 bits. Each of the memories is composed of 64 modules of the type 2117. The output data appears on data path 380 which has a width of 16 bits. The other parts will be described during the description of the operation.

Operation takes place in four steps. During the first step, the two data fields R1, R4 are extracted from each data record of the first type R1, R2, R3, R4) in the circuit of FIG. 7. The contents of one or more of the data fields R1, R2, R3, R4 may be subjected to a selection criterion, is necessary. In the example, first the field R1 appears, followed by the field R4. The element 352 is a memory element having a capacity of 32 bits (R1 and R4 both have a length of 16 bits) and an input with a width of 8 bits and an output with a width of 32 bits. This element is composed of four modules of the type "164" and two modules of the type "273". A clock pulse appears on the input 386 once per data byte received in order to control the storage; once per four data bytes received the same clock pulse signal, divided by four by means of a divider appears on the input 384, in order to control the output. When the four bytes appear on the output of SIPO (serial-in-parallel-out) element 352, the data paths are activated as follows;

The signal f0 makes the data selector 356 conduct the data R4 received from the element 352. In multiplexer 354, the signal f1 despatches the data R1 via data path 388 (width 16 bits). The signal f1 also makes the data selector 378 conduct the data on data path 388. In multiplexer 374, the signal f2 despatches the data received to the data input of memory 370. The signal f2 furthermore makes the data selector 368 conduct the data received from data selector 356. The latter data acts as the address for the memory 370. Element 364 is a four-divider and receives a clock pulse once per data byte received. The pulses on the lines 384, 386 and for element 364 can be formed, if necessary, by a generator of the same kind as the element 412 of FIG. 7, and is then controlled by element 258 of FIG. 6. The signal f2 despatches the clock pulse train, divided by four, as a write control signal to the memory 370 (possibly after adaptation of the length and the shape thereof). The values of the data field R1 are thus written in memory 370 at the address given by the value of R4. The memory 370 may also receive an additional signal on an activation input (not shown) for activating any memory access, reading as well as writing. In the described embodiment, this is realized by means of a "chip select" which is derived, by way of an FPLA circuit (not shown for the sake of brevity) from the 16-bit address received. The selection between reading and writing is then controlled by the signal from element 366. The memory 372 is not important for the foregoing. It has been assumed that only one content of the data field R1 is associated with a given content of the data field R4. The reverse need not be true. Moreover, the same values of the combination R1/R4 may in principle occur in different data records; this implies repeated writing of the same data at the same address of the memory 370. During the second step, the values of the binary signals f1, f2 are inverted. Furthermore, the SIPO element 352 is successively loaded with the data fields R4 and R7 selected from the second type of data record (R4, R5, R7). The content of R4 is thus active again, however via the multiplexer 354 and data selector 368, as the address for the memory 370. Due to the modified control of multiplexer 366, memory 370 is now activated in the read mode and memory 372 in the write mode. The signal f2 makes the data selector 376 conduct the data (R1) read from the memory 370. This data is applied, via data path 380, data selector 378 and multiplexer 374, to the data input of the memory 372. The signal f2 makes the data selector 362 conduct the data received from data selector 356: this is the content of the data field R7. Thus, the content of the memory 370 is transferred to the memory 372, the address values being transferred from the content of data field R4 to the content of the data record R7. A restriction as regards the content is again imposed during this second step:

any value of R7 may imply only one and the same value of R4. The reverse need not be true: the latter would mean that more locations are used in the memory 372 than in the memory 370.

During the third step, the value of the binary signal f2 is inverted. The contents of the data fields R7, R9 selected from the third type of data record (R6, R7, R8, R9) are then successively stored in the element 352. Thus, a read operation takes place again in the memory 372. Via the data selector 376, the data path 380, the data selector 378 and the multiplexer 374, the data is stored again in the memory 370; however, it is now stored at addresses formed by the contents of the data fields R9. If the value of f2 is subsequently inverted again, the described second step if repeated, be it that now the read addresses are formed by the content of the data field R9, while the write addresses are formed by the content of the data field R11. If the procedure has to be continued in given cases, the control of the third step is subsequently repeated. The restrictions as regards the content as described with reference to the second step then remain applicable.

In every step, the data of the data field R1 always becomes available on the line 380. Thus, a user device (not shown for the sake of simplicity) can be connected thereto. If desired, the memories 370, 372 may comprise a general reset input for completely erasing the content. If the order of the data fields in the element 352 is incorrect during one or more of the described steps, correction can be performed by activation of the data selectors 362, 368 by means of an additional binary signal f3; this signal f3 has a value which is the inverse of the prevailing value of f2; if this problem occurs during the first step, however, the described correction is not possible. The further operation of the device remains the same.

A number of parts for the successive reading of a number of memory locations are also provided. These parts are the oscillator 360 (possibly the same oscillator as the one in FIG. 7) and the counter 358. In ordr to cover the memories 370/372 completely, this counter has a length of 16 bits. If the value of the signal f0 is inverted with respect to the described first step, the oscillator 360 supplies counting pulses (CK OUT) for external use, and also supplies counting pulses for internal use to counter 358. The latter also receives the signal f0. This signal acts as a reset signal, so that at the start of the oscillations (or the conduction of the output signals of the oscillators), the counter starts counting from the zero state. The signal f0 also makes the data selector 356 conduct the content of the counter position which content is capable of addressing one of the memories 370, 372 as desired (by means of f2). The output carry signal TC of the counter 358 is fed back to the count enable input thereof, so that the counter 358 stops after the completion of one counting cycle. The clock signal CKOUT synchronizes a data user each time with the appearance of a 16-bit word on line 380. The signals f0, f1, f2 can also be formed by the decoding of the content of a counter. This counter is not shown, but is advanced one position each time by the "ready" signal on the line 426 in FIG. 7. The number of times that the "reset" signal is applied to the "R" input of element 408 in FIG. 7 is determined by the number of steps to be executed.

The following realizations are also attractive in FIG. 8: the oscillator 360 as a module 74124; the counter 358 as two modules "163", the data selectors 356, 362, 368, 376, 378 each time as four modules of the type "157"; the multiplexers 354, 374 each time as two modules of the type "240" plus two modules of the type "241"; the divider 364 as a module of the type 7474; the multiplexer 366 as one half of a module 7400 plus 1/6 of a module 7404. Thus, under the selective control by the signals CK+4, the signals f2 are pulsed in order to realize the signals WE for input to the memories 370, 372. The reading in these memories is continuously controlled.

The described embodiment requires approximately 195 integrated modules; the maximum dissipation is approximately 31 W. The projection memories together require two "EUROCARDS" with printed wiring; control requires one card with connections according to the wire-wrap technology.

In the foregoing, the "selection" and "projection" modes have been explained. A still further mode of operation is the "composition" mode. In certain user environments the data base may contain a plurality of tables (A $K_1$), (A $K_2$), (A $K_3$), etcetera. For ech member of the set of elements A, the first table may contain quantity $K_1$, the second table may contain quantity $K_2$, and so on. Each table may also contain entries that are not in the set of elements A, while the table may also contain further quantities for the set of elements A. These latter data could be rendered inoperative by the operations "selection" and "projection", respectively; the latter operations were disclosed hereabove. Now, the "composition" mode would provide a table (A $K_1$ $K_2$ $K_3$). The "composition" mode is now executed in the following steps:

(a) the table (A $K_1$) is stored in a shift register, wherein each element A uses a location of the shift register. Each location would accommodate one entry of the final table (A $K_1$ $K_2$ $K_3$).

(b) the table A $K_2$ is stored in a random access memory, wherein the random access memory would be addressable by the quantity A and need to store only the corresponding quantity $K_2$.

(c) the shift register is retrocoupled from output to input for reading and restoring the table (A $K_1$). Therein each quantity A read out from the shift register is also used for addressing in a read access mode, the random access memory. The associated quantity $K_2$ would in the same operation be written in the same shift register location as the corresponding entry in the table (A $K_2$). When the shift register has been cycled once, an intermediate table A $K_1$ $K_2$) is constituted. In a further cycle the table A $K_1$ $K_2$ $K_3$) is formed. If the tables A $K_2$) and A $K_3$) were stored in separate intermediate RAM's, only a single cycle of the shift register were required. The shift register could be virtual in that a read-write cycle were executed on a sequence of address locations in a further random access memory.

What is claimed is:

1. A data base processor for processing a sequence of data records each of up to a multibyte maximum length, said processor comprising:
 a. a first input for at least byte-wide receiving the bytes of a data record from a background memory;
 b. a one input, two output selector, fed by said first input for selectively connecting said first input to one of the selector outputs;
 c. a two section data buffer, each of the two sections fed by an associated one of the two selector outputs and each section having storage capacity for storing a data record, said data buffer having a control element for selectively controlling the section connected to said first input in a write mode and the other section in a read mode;

d. a reference memory for storing a reference record and having a storage capacity equal to said multibyte maximum length;

e. a mask memory for storing a mask record and having a storage capacity equal to said multibyte maximum length;

f. an address generator for addressing in parallel said two sections, said reference memory and said mask memory with mutually equal addresses;

g. a first comparison element for bitwise and byte-wide comparing, under control of an associated mask bit of the mask record read from the mask memory, a data bit received on said first input with an associated reference bit of the reference record read from the reference memory, said first comparison element having a first result output for outputting a mismatch bit upon detection of a mismatch condition;

h. a second comparison element for bitwise and byte-wide comparing a plurality of data bits received on said first input with a plurality of multibit reference data in parallel, said second comparison element comprising selection means connected to said first input for selecting said plurality of data bits from a data record received, a membership memory (172) having an address input connected to an output of said selection means for receiving said plurality of data bits in parallel, said membership memory having a first data content on any location addressable by a d-ata byte equal to one of said multibit reference data, and a second data content on any other location, said first data content upon addressing giving a first "correct" signal;

i. a bistable indicator element having a set input for receiving a set signal which sets the bistable indicator element to a "provisionally correct" state upon transition from a data record in said sequence to a next successive record in said sequence, and a reset input connected to said result output to reset said bistable indicator element to an "incorrect" state upon reception of said mismatch bit;

j. interchange means connected to said control element for alternating said read and write modes between said two sections at least upon detecting said transition in combination with either the prevailing "provisionally correct" state indicating a match condition signal for the preceeding data record or upon detecting said first "correct" signal for the data record received in said data buffer most recently;

k. a two input, one output multiplexer fed by said two sections for selectively outputting a data record addressed by said address generator in a read operation under control of said first "correct" signal and said match condition signal.

2. A data base processor as claimed in claim 1, wherein said output multiplexer comprises a combinatorial circuit for combining said first "correct" signal and said match condition signal to generate therefrom a control signal for the multiplexer to output the data record addressed by said address generator in a read operation.

3. A data base processor for processing a sequence of data records each of up to a multibyte maximum length, said processor comprising:

a. a first input for at least byte-wide receiving the bytes of a data record from a background memory;

b. a one input, two output selector, fed by said first input for selectively connecting said first input to one of the selector outputs;

c. a two section data buffer, each of the two sections fed by an associated one of the two selector outputs and each section having storage capacity for storing a data record, said data buffer having a control element for selectively controlling the section connected to said first input in a write mode and the other section in a read mode;

d. a reference memory for storing a reference record and having a storage capacity equal to said multibyte maximum length;

e. a mask memory for storing a mask record and having a storage capacity equal to said multibyte maximum length;

f. an address generator for addressing in parallel said two sections, said reference memory and said mask memory with mutually equal addresses;

g. a first comparison element for bitwise and byte-wide comparing, under control of an associated mask bit of the mask record read from the mask memory, a data bit received on said first input with an associated reference bit of the reference record read from the reference memory, said first comparison element having a first result output for outputting a mismatch bit for upon detection of a mismatch condition;

h. an extract generator comprising a second mask memory which is addressed in parallel with said buffer sections, said second mask memory having a first data content on any location corresponding to an element of a data record to be extracted, and a second data content on any other location;

i. a bistable indicator element having a set input for receiving a set signal which sets the bistable indicator element to a "provisionally correct" state upon transition from a data record in said sequence to a next successive record in said sequence, and a reset input connected to said result output to reset said bistable indicator element to an "incorrect" state upon reception of said mismatch bit;

j. interchange means connected to said control element for alternating said read and write modes between said two sections at least upon detecting said transition in combination with the prevailing "provisionally correct" state indicating a match condition signal for the preceeding data record;

k. a two input, one output multiplexer fed by said two sections for selectively outputting the contents of a data record addressed by said address generator in a read operation under control of said match condition signal and under condition of said second mask memory outputting a said first data content.

4. A data base processor as claimed in claim 3, wherein said second mask memory has the same capacity as each of said buffer sections for containing said first or second data content for each data bit, and wherein said output multiplexer comprises a series/parallel converter, whose series input is activated by said first data content to receive a data bit to be extracted and whose parallel output constitutes the output of said data base processor.

5. A data base processor for processing a sequence of data records each of up to a multibyte maximum length, said processor comprising:

a. a first input for at least byte-wide receiving the bytes of a data record from a background memory;

b. a one input, two output selector, fed by said first input for selectively connecting said first input to one of the selector outputs;

c. a two section data buffer, each of the two sections fed by an associated one of the two selector outputs and each section having storage capacity for storing a data record, said data buffer having a control element for selectively controlling the section connected to said first input in a write mode and the other section in a read mode;

d. a reference memory for storing a reference record and having a storage capacity equal to said multibyte maximum length;

e. a mask memory for storing a mask record and having a storage capacity equal to said multibyte maximum length;

f. an address generator for addressing in parallel said two sections, said reference memory and said mask memory with mutually equal addresses;

g. a first comparison element for bitwise and byte-wide comparing, under control of an associated mask bit of the mask record read from the mask memory, a data bit received on said first input with an associated reference bit of the reference record read from the reference memory, said first comparison element having a first result output for outputting a mismatch bit upon detection of a mismatch condition;

h. a second comparison element for bitwise and byte-wide comparing a plurality of data bits received on said first input with a plurality of multibit reference data in parallel, said second comparison element comprising selection means connected to said first input for selecting said plurality of data bits from a data record received, a membership memory (172) having an address input connected to an output of said selection means for receiving said plurality of data bits in parallel, said membership memory having a first data content on any location addressable by a data byte equal to one of said multibit reference data, and a second data content on any other location, said first data content upon addressing giving a first "correct" signal;

i. a bistable indicator element having a set input for receiving a set signal which sets the bistable indicator element to a "provisionally correct" state upon transition from a data record in said sequence to a next successive record in said sequence, and a reset input connected to said result output to reset said bistable indicator element to an "incorrect" state upon reception of said mismatch bit;

j. interchange means connected to said control element for alternating said read and write modes between said two sections at least upon detecting said transition in combination with either the prevailing "provisionally correct" state indicating a match condition signal for the preceding data record or upon detecting said first "correct" signal for the data record received in said data buffer most recently;

k. a two input, one output multiplexer fed by said two sections for selectively outputting a data record addressed by said address generator in a read operation under control of said first "correct" signal and said match condition signal;

l. means for a projection among a series of n types of data record each record of type j having two mutually exclusive data fields B(j), the sequence of data fields constituting a notional composite data record, said projection implying the generation of a link between data fields B(0) and B(n), wherein there is provided:

a first projection memory (370) having its address input connected to an output of said output multiplexer for successively receiving the contents of data fields B(1), B(3) . . . as successive respective addresses and a data input connected to the output of said output multiplexer for receiving the contents of data field B(0); and a second projection memory (372) having its address input connected to the output of said output multiplexer for successively receiving the contents of data fields B(2), B(4) . . . as successive respective addresses; wherein a data output of the first projection memory is connected to a data input of the second projection memory and a data input of the second projection memory is connected to a data input of the first projection memory, said data processor having means for in a first projection step receiving a first type of record and writing the content of data field B(0) of a record of said first type in the first projection memory addressed by the content of data field B(1) of the last mentioned record, for in a second projection step receiving a second type of record, reading the content of data field B(0) in the first projection memory addressed by the content of data field B(1) of a record of said second type and writing the content of data field B(0) read out in the second projection memory addressed by the content of data field B(2) of the last mentioned record, for in a third projection step receiving a third type of record, reading the content of data field B(0) in the second projection memory addressed by the content of data field B(2) of a record of said third type and writing the content of data field B(0) then read out in the first projection memory addressed by the content of data field B(3) of the last mentioned record.

6. A data base processor for processing a sequence of data records each of up to a multibyte maximum length, said processor comprising:

a. a first input for at least byte-wide receiving the bytes of a data record from a background memory;

b. a one input, two output selector, fed by said first input for selectively connecting said first input to one of the selector outputs;

c. a two section data buffer, each of the two sections fed by an associated one of the two selector outputs and each section having storage capacity for storing a data record, said data buffer having a control element for selectively controlling the section connected to said first input in a write mode and the other section in a read mode;

d. a reference memory for storing a reference record and having a storage capacity equal to said multibyte maximum length;

e. a mask memory for storing a mask record and having a storage capacity equal to said multibyte maximum length;

f. an address generator for addressing in parallel said two sections, said reference memory and said mask memory with mutually equal addresses;

g. a first comparison element for bitwise and byte-wide comparing, under control of an associated mask bit of the mask record read from the mask memory, a data bit received on said first input with an associated reference bit of the reference record read from the reference memory, said first comparison element having a first result output for outputting a mismatch bit for upon detection of a mismatch condition;

h. an extract generator comprising a second mask memory which is addressed in parallel with said buffer sections, said second mask memory having a first data content on any location corresponding to an element of a data record to be extracted, and a second data content on any other location;

i. a bistable indicator element having a set input for receiving a set signal which sets the bistable indicator element to a "provisionally correct" state upon transition from a data record in said sequence to a next successive record in said sequence, and a reset input connected to said result output to reset said bistable indicator element to an "incorrect" state upon reception of said mismatch bit;

j. interchange means connected to said control element for alternating said read and write modes between said two sections at least upon detecting said transition in combination with the prevailing "provisionally correct" state indicating a match condition signal for the preceding data record;

k. a two input, one output multiplexer fed by said two sections for selectively outputting the contents of a data record addressed by said address generator in a read operation under control of said match condition signal and under condition of said second mask memory outputting a said first data content;

means for a projection among a series of n types of data records, each record of type j having two mutually exclusive data fields B(j), the sequence of data fields constituting a notional composite data record, said projection implying the generation of a link between data fields B(0) and B(n), wherein there is provided:

a first projection memory (370) having its address input connected to an output of said output multiplexer for successively receiving the contents of data fields B(1), B(3) . . . as successive respective addresses and a data input connected to the output of said output multiplexer for receiving the contents of data field B(0); and a second projection memory (372) having its address input connected to the output of said output multiplexer for successively receiving the contents of data fields B(2), B(4) . . . as successive respective addresses; wherein a data output of the first projection memory is connected to a data input of the second projection memory and a data input of the second projection memory is connected to a data input of the first projection memory, said data processor having means for in a first projection step receiving a first type of record and writing the content of data field B(0) of a record of said first type in the first projection memory addressed by the content of data field B(1) of the last mentioned record, for in a second projection step receiving a second type of record, reading the content of data field B(0) in the first projection memory addressed by the content of data field B(1) of a record of said second type and writing the content of data field B(0) read out in the second projection memory addressed by the content of data field B(2) of the last mentioned record, for in a third projection step receiving a third type of record, reading the content of data field B(0) in the second projection memory addressed by the content of data field B(2) of a record of said third type and writing the content of data field B(0) then read out in the first projection memory addressed by the content of data field B(3) of the last mentioned record.

* * * * *